United States Patent [19]

Takeda et al.

[11] 4,376,810

[45] Mar. 15, 1983

[54] ALKALINE CELL

[75] Inventors: Kazutoshi Takeda; Koichi Sugimoto, both of Tokyo, Japan

[73] Assignee: Kabushiki Kaisha Daini Seikosha, Japan

[21] Appl. No.: 187,529

[22] Filed: Sep. 15, 1980

Related U.S. Application Data

[63] Continuation of Ser. No. 100,852, Dec. 6, 1979, abandoned, which is a continuation of Ser. No. 878,482, Feb. 16, 1978, abandoned.

[30] Foreign Application Priority Data

Feb. 21, 1977 [JP] Japan .................. 52-17980

[51] Int. Cl.³ .......................................... H01M 10/48
[52] U.S. Cl. ...................................... 429/90; 429/218; 429/229; 429/230
[58] Field of Search ....................... 429/90–92, 429/219, 206, 229, 230, 218

[56] References Cited

U.S. PATENT DOCUMENTS

| | | | |
|---|---|---|---|
| 2,942,052 | 6/1960 | Bourke et al. | 429/91 |
| 2,982,705 | 5/1961 | Sakane et al. | 429/219 X |
| 3,427,203 | 2/1969 | Fletcher | 429/219 |
| 3,615,858 | 10/1971 | Soto-Krebs | 429/219 X |
| 3,757,793 | 9/1973 | Fester et al. | 429/92 X |
| 3,945,851 | 3/1976 | Mote et al. | 429/219 X |
| 4,025,700 | 5/1977 | Fagan, Jr. et al. | 429/91 |
| 4,144,382 | 3/1979 | Takeda et al. | 429/91 |

*Primary Examiner*—Anthony Skapars
*Attorney, Agent, or Firm*—Robert E. Burns; Emmanuel J. Lobato; Bruce L. Adams

[57] ABSTRACT

An electrochemical alkaline cell of the type comprising an anode, cathode and electrolyte for generating electrical energy and exhibiting an output discharge voltage comprises a consumable anode composed of zinc-indium-mercury alloy. The indium constituent is present in an amount of from more than 2% to 10% by weight and the mercury constituent is present in an amount 2% to 14% by weight with respect to the weight amount of the zinc constituent thereby obtaining a cell discharge voltage at one voltage level during substantially the whole useful life of the cell due to consumption of the zinc constituent followed by an abrupt lowering of the cell discharge voltage to a distinctly lower voltage level for the remainder of the cell useful life due to consumption of the indium and mercury constituents. The abrupt change of the cell discharge voltage to the lower level signifies that the cell is near exhaustion and should be replaced.

8 Claims, 8 Drawing Figures

ALKALINE CELL

This is a continuation of application Ser. No. 100,852, filed Dec. 6, 1979, now abandoned, which is a continuation of application Ser. No. 878,482, filed Feb. 16, 1978, now abandoned.

BACKGROUND OF THE INVENTION

This invention relates to alkaline cells having means to detect the cell life thereof.

In general, alkaline cells, such as nickel-zinc cells, air-zinc cells, iron-nickel cells, alkali-manganess cells, mercury oxide cells, silver oxide cells, divalent silver oxide cells and the like, maintain continuously their discharge voltage at certain constant values from the beginning to the end stage of discharge.

Accordingly, it has been very difficult to determine in advance when the active material in such conventional alkaline cells is near consumption, and to find out the suitable replacing time of such cells. So that if they are incorporated in very important apparatus, such as a power source of an artificial cardio-stimulating device which directly affects human life, there is a serious disadvantage that such cells must be replaced after a certain definite period of use from a view-point of safety even though the cell active material thereof still remains usable afterward.

It is therefor, an object of this invention to provide an alkaline cell which can detect the end of the cell life by showing a low discharge voltage of indium after the consumption of the main anode active material, that is, zinc.

Heretofore, the use of an anode active material comprising zinc and indium was well-known in the art. The purpose for using this type anode active material is to obtain elimination of mercury, accordingly the zinc particles are treated into solution with the indium or the indium compound is dissolved in hydrochloric acid and washed with much water. And also known in the prior art is an anode active material comprising zinc, indium and mercury. The purpose for using this type active material is to prevent mercury-pollution according to a decrease of the mercury content by adding a micro-quantity on the order of 0.0001–2% of indium by weight of the anode active material.

Further, the anode active material comprising zinc-alloy containing 0.5% of lead (Pb), 0.02% of cadmium (Cd) and 0.02% of indium (In) by weight is also well-known in the art.

Furthermore, the anode active material comprising indium only is well-known. For example the indium-mercury oxide: (In/HgO) Cell (open circuit voltage $E_o = 1.16$ V) and the indium-monovalent silver oxide (In/Ag$_2$O) cell (open circuit voltage $E_o = 1.35$ V) have heretofore been produced.

However, although indium is an excellent anode active material as is zinc, it is a very rare material as a natural resource and high in price, so that such cells have not been widely developed.

As mentioned above, the indium anode active material and the zinc anode active material containing one of indium and mercury, or both, are well-known in the art, but the objects of these conventional cells are largely different from that of this invention. And the indium content of conventional cells is very small in quantity, on the order of 0.0001–2% by weight, however, the object of this invention does not aim to decrease the mercury content of the zinc anode active material but to produce indium-mono silver oxide potential ($E_o = 1.35$ V) at the end stage of the cell by adding over 2% of indium for zinc by weight and utilizing the indium as an active material of the cell. And moreover, the main anode active material of the cell of this invention is zinc, therefore the raw material cost of the cell does not become so high.

According to this invention, when the cell approaches the end of its useful life, such can be detected by altering the cell discharging voltage at the end discharging stage so as to be able to replace it with a new one before the cell drops its discharge voltage to stop operations of electronic instruments such as electronic wrist watch, camera, pocket-bell, hearing aid, artificial cardio stimulating device and the like.

DETAILED DESCRIPTION OF PREFERRED EMBODIMENTS

Figure 1:
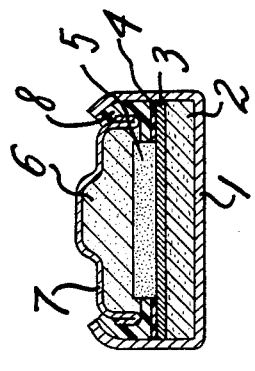
FIG. 1 is a cross-sectional view of a silver oxide cell according to this invention.

This invention will be described according to the embodiment as applied to a silver oxide cell and referring to the drawings.

FIG. 1 is a cross-sectional view of a silver oxide cell of Japan Industrial Standard GS-12 type (11.6 mm diameter × 4.2 mm high) constructed according to this invention.

"1" is a cathode container having housed therein depolarizing mix "2" composed of monovalent silver oxide (Ag$_2$O) and graphite or acetylene black, or mainly composed of divalent silver oxide (AgO), a separator 3, a plastic ring "4" and an electrolyte absorbing material "5." "7" is an anode cap which houses therein an anode active material "6." "8" is a gasket or grommet made of suitable polyamide resin for insulating between the anode and cathode and for sealing.

The following examples describe the preferred embodiments of this invention.

EXAMPLE 1

Figure 2:
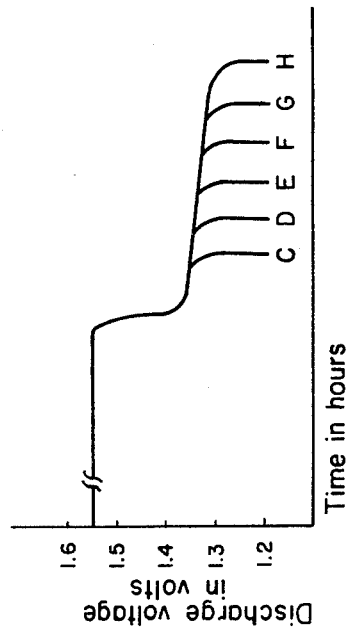
FIG. 2 is a diagram showing the relation between the indium content for zinc and the indium theoretical capacity for the anode overall theoretical capacity.

FIG. 2 shows the theoretical capacity of indium for the overall theoretical anode capacity when the indium and zinc contents have various values and at the constant quantity of mercury for the zinc. As is obvious from this figure, the time duration of the potential of indium-monovalent silver oxide (In-Ag$_2$O) (discharge voltage 1.37–1.30 V, external resistance R=7.5 K$\Omega$)

can be set arbitrarily as desired in accordance with the change the indium contents for the zinc, after finishing the potential of zinc-monovalent silver oxide (Zn-Ag$_2$O) (discharge voltage 1.59–1.40 V, external resistance R=7.5 K$\Omega$).

The indium contents for the zinc will be discussed by using the cell shown in FIG. 1.

In the first place, 2 parts of indium and 10.9 parts of mercury by weight are put into a suitable glass bottle and mixed by a light vibrating operation. By this operation, a liquid indium-mercury alloy can easily be produced. After 98 parts by weight of zinc powder of 48–150 mesh particles are put into the bottle containing the said liquid indium-mercury alloy and pluged perfectly thereafter, said bottle is shaken for about 3 hours. And after shaking, the bottle is heated for about one hour in a 60° C. constant temperature both to cause through diffusion and cross-linking reaction of the zinc, indium and mercury. Then, after cooling, the powder of indium mercury-zinc alloy, produced by said operations, is screened with the 48–150 mesh screener and thereafter is used as the anode active material.

The 48–150 mesh powders of indium-mercury-zinc alloy are mixed with a gelatinizer, such as sodium polyacrylate, carboxymethyl cellulose, polyvinyl alcohol, polyethylene glycol, soluable starch, sodium alginate, corn starch or the like, and thereafter gelatinized with alkaline electrolyte, such as sodium hydroxide, potassium hydroxide, lithium hydroxide or the like, or pressformed as the anode active material for putting to use.

Figure 3:
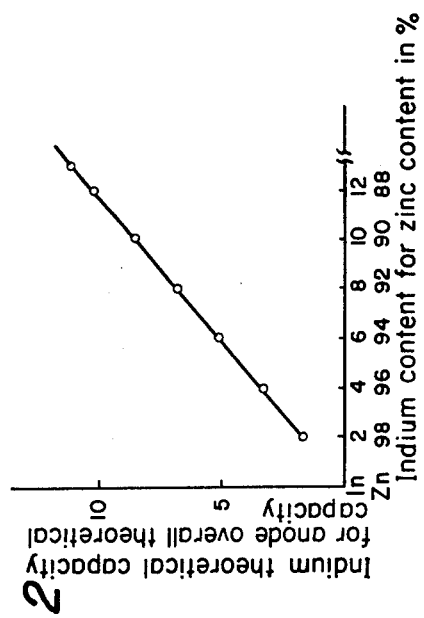
FIG. 3 is a diagram showing the discharge characteristics of this inventive cell under constant resistance of 7.5 K$\Omega$ compared to that of a conventional cell.

A cell was fabricated as shown in FIG. 1 using the anode active material produced by the above method, and when the cell was made to discharge under the constant resistance of 7.5 K$\Omega$ at room temperature, the discharging curve A having two step plateaus was obtained as shown in FIG. 3. In this figure, the plateau "a-b" shows zinc-monovalent silver oxide (Zn-Ag$_2$O) potential and the plateau "c-d" shows indium-monovalent silver oxide (In-Ag$_2$O) potential. FIG. 3 shows the discharge characteristics of this invented cell with the aforedescribed indium content and the conventional cell without indium under the constant resistance of 7.5 K$\Omega$, wherein "A" shows that of the invented cell and "B" that of the conventional cell.

In the same manner, anode active materials of 4, 6, 8, 10 and 12 percent indium contents by weight for the zinc have been produced and the cells as shown in the FIG. 1 have been fabricated by using such materials and then the time durations of the indium-monovalent silver oxide (In-Ag$_2$O) potential have been investigated by discharging the cells under the constant resistance of 7.5 K$\Omega$ at room temperature.

Figure 4:
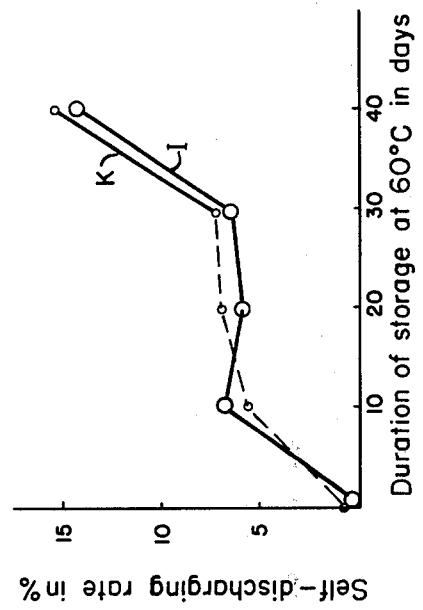
FIG. 4 is a diagram showing the discharge characteristics of this inventive cell under constant resistance of 7.5 K$\Omega$ having a changed indium content for the zinc.

FIG. 4 shows the discharge characteristics of the end stages of these cells, wherein C, D, E, F, G, and H respectively show the invented cells of 2, 4, 6, 8, 10 and 12% indium contents.

As obvious from FIG. 4, the time duration of the indium-monovalent silver oxide (In-Ag$_2$O) potential becomes longer according to an increase of the indium contents.

However, if the indium content of the cell increases, the zinc discharge capacity should become smaller since the quantity of anode active material for one cell is always constant. That is to say, the time duration of this zinc-monovalent silver oxide (Zn-Ag$_2$O) potential is shortened and, as a result thereof, the operating time durations of various electronic instruments powered by the cell are also shortened.

From these facts, the upper limit of the indium content is judged to be under 10%.

And the least necessary time duration to make the end of the cell life recognizeable for detecting the life-end thereof by operating a suitable alarm device is sufficiently effective with the 2% indium content for zinc.

EXAMPLE 2

Next, the mercury content for zinc will be discussed. Now, 4.8 parts of indium (5% for the zinc) and 8 parts of mercury (8% for the zinc) by weight are put into a suitable glass bottle and mixed by means of a light vibrating operation. By this operation, a liquid indium-mercury alloy can easily be produced. After 92 parts by weight of zinc powder of 48–150 mesh particles are put into the bottle containing the liquid indium-mercury alloy and pluged perfectly thereafter, said bottle is shaken for about 3 hours and after shaking, the glass bottle is heated for about one hour in the 60° C. constant temperature bath, and the diffusion and cross-linking reaction of zinc, indium and mercury is thereby carried out. Then, after cooling, the powder of indium-mercury-zinc alloy produced by said operations is screened with the 48–150 mesh screener and thereafter used as the anode active material.

The said 48–150 mesh powders of indium-mercury-zinc alloy are mixed with a gelatinizer, such as sodium polyacrylate, carboxylmethyl cellulose or the like and thereafter gelatinized with alkaline electrolyte or pressformed as the anode active material for putting to use.

A cell was fabricated as shown in FIG. 1 using the said anode active material produced by the above method and the self discharging rate of this cell was investigated.

The invented cell and the conventional cell were maintained at 60° C. in a constant temperature bath for 10, 20, 30, and 40 days and the discharge capacities thereof were calculated by discharging them under constant resistance of 7.5 K$\Omega$ at room temperature, the self discharging rates thereof were measured against the primary discharge capacities before immersing the cells in the constant temperature bath.

The calculating formula for the self-discharge rate is the following:

$$\text{Self discharging rate} = \frac{C_o - C_i}{C_o} \times 100 \, (\%) \qquad (1)$$

In which "Co" is the primary discharge capacity measured at 25° C. temperature under constant resistance of 7.5 K$\Omega$ before immersion in the 60° C. constant temperature bath, and "Ci" is the same measured at the same temperature and under the same resistance after immersion in the 60° C. constant temperature bath for 10, 20, 30 and 40 days.

Figure 5:
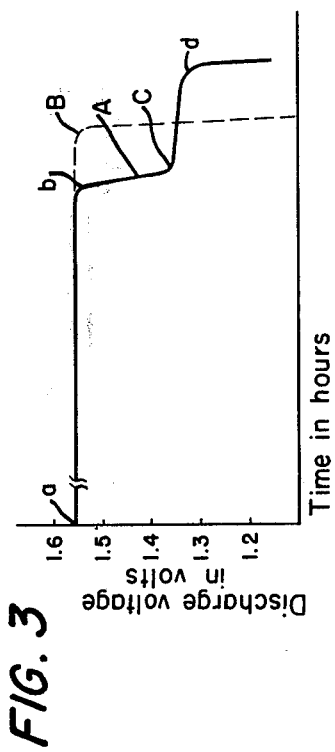
FIG. 5 is a diagram showing the self-discharging rate of this inventive cell as compared to that of a conventional cell.

FIG. 5 shows the self-discharging rates of the invented cell compared with a conventional one without indium content wherein the solid-line I is a plot of inventive cell and the dotted-line K is a plot of the conventional cell, and these plotted values are the mean values of self discharging rates of each 25 cells respectively.

From FIG. 5, it is found that the self-discharging rates of both the invented cell and the conventional one have no difference and the indium content in the anode active material has entirely no ill-effect on the self-discharging rate thereof.

Therefore, it can be seen that this invented cell has little self-discharge and superior storageability. And it is confirmed by the inventor that the 20 days storage at 60° C. temperature and the 40 days storage at the said preserving accelerated shelf life tests at 60° C. are respectively equivalent to the one year storage at room temperature and the two years storage at the same temperature.

Accordingly, the self-discharging rate of the invented cell after storing for two years can be estimated to be under 15%, so that this value has no-trouble in practical use.

By the same manner, the indium content for the zinc has been fixed at 5% by weight and the mercury contents for the zinc have been changed to various percentages and then these self-discharging rates have been investigated.

The anode active material of 2, 4, 6, 8, 10, 12 and 14% mercury contents by weight for the zinc have been produced and cells as shown in the FIG. 1 have been fabricated and then the self discharging rates thereof have been measured.

Figure 6:
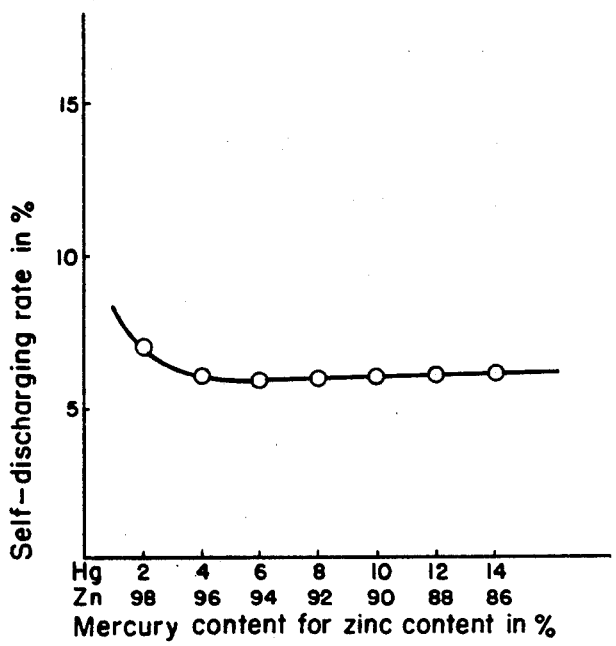
FIG. 6 is a diagram showing the self-discharging rate of this inventive cell for changing mercury content to the zinc.

FIG. 6 shows the self discharging rates of the invented cells by changing the mercury contents for the zinc. The self discharging rates were derived after 20 days storages at 60° C.

As evident from FIG. 6, if the mercury contents are within the range of 2-14% by weight for the zinc, the self-discharging rates of the cells have entirely no trouble in practical use. And if the mercury content of the cell decreases below 2%, its self-discharging rate increases and when the cell becomes excessively discharged, there is a danger of swelling up of the cell caused by gas generation of the anode active material. On the other hand, if the mercury content increases beyond 14% and in view of the fact that the filling-up quantity of anode material for one cell is limited by the size of the cell the discharge capacity of the cell main active material, that is, the zinc, becomes naturally small, in spite of its largely decreasing self-discharging rate.

As mentioned above, the optimal compositions of the anode active material of this invention are that the indium content lies within the range of 2-10% by weight for the zinc and the mercury content within the range of 2-14% by weight for the zinc.

Several embodiments of the anode active material "6" of this invention as shown in FIG. 1 will now be described.

EXAMPLE 3

95 parts by weight of zinc powder of 48-150 mesh size and 10 parts by weight of indium III chloride ($InCl_3$) are mixed and stirred with 500 ml of distilled water in a glass container and then after the supernatant liquid thereof is removed, 7 parts by weight of mercury (II) chloride ($HgCl_2$) and 500 ml of distilled water are added thereon in said glass container and mixed and stirred. After the mixing and stirring operation and after again removing the supernatant liquid thereof, the alloy powder of zinc-indium-mercury is neutralized with sodium carbonate and thereafter washed with distilled water. Then, the said alloy powder is dried and screened with a 48-150 mesh screener.

The composition of said zinc-indium-mercury alloy powder shows approximately in weight ratio Zn:In:Hg=90:5:5 according to chemical analysis.

This zinc-indium-mercury alloy powder of 48-150 mesh is mixed with the gelatinizer such as sodium polyacrylate, carboxymethyl cellulose, polyvinyl alcohol or the like and gelantinized with alkaline electrolyte or press formed as the anode active material of this invented cell for putting to use.

A cell of the type shown in FIG. 1 was fabricated using said anode active material of this invention. The cell was discharged under constant resistance of 7.5 K$\Omega$ at room temperature, and exhibited an output voltage of 1.57-1.40 V for a time duration of 500-550 hours and 1.40-1.20 V for 2-15 hours.

By measuring and detecting the cell voltage of this cell, the consumption of the main anode active material, zinc, the approach of the cell life end can be foretold and detected.

Accordingly the various electronic instruments using this invented cell as power sources such as electronic wrist watches, cameras, table calculators, pocket bells, artifical cardio stimulating devices and the like can detect the cell life end before the operations thereof stop completely.

The cell of the invention can be used to activate a display mechanism warning of the approaching cell life end or an alarm pre-caution mechanism by utilizing the discharging voltage change of the cell at the end stage of the discharge thereof.

For example the pre-caution mechanism may comprise a warning sign in the form of a flashing or blinking lamp, speaker, buzzer, various signals, a changing movement of the clock hands or the like, and may comprise a suitable color change of the display of liquid crystal material or luminous diodes or the like, to provide an indication of the end of the cell life.

And if this invention applies to the various secondary cells, the charging operation thereof can be started by the means of solar cells or other charging means when the voltage change of the primary cell is detected.

Furthermore, though zinc powder is used in this embodiment, zinc plate, zinc block, zinc foil or fibroid zinc can also be used, and other soluable indium compounds can be used instead of the indium chloride.

EXAMPLE 4

95 parts by weight of zinc powder of 48-150 mesh and 5 parts by weight of indium are put into a glass container containing 500 ml of diluted solution of hydrochloric acid, and then they are mixed and stirred till the zinc-indium alloy is produced. And thereafter 5 parts by weight of mercury is added thereto and they are mixed and stirred again till the zinc-indium-mercury alloy is produced. After removing the solution from the container, this zinc-indium-mercury alloy is washed with distilled water and dried. Then, the said alloy powder is screened with a 48-150 mesh screener and used as the anode active material of a cell according to the invention.

The zinc powders are used in this embodiment, but other types of zinc can be also used.

Further, in this embodiment, mercury is added after producing the zinc-indium alloy but the mixing sequence of these three elements can be variously changed.

For example, the zinc may be added after producing the indium-mercury alloy and also these said three elements may be mixed at the same time.

And furthermore, the acid solution is used as a reacting solution in the examples 3 and 4, but an alkali solution such as sodium hydroxide, or a mixing solution of ammonium hydroxide and ammonium chloride may also be used.

EXAMPLE 5

By amalgamating with mercury or mercury compound the zinc-indium alloy produced by melting and casting processes, a zinc-indium-mercury alloy is made and then used as the anode active material of a cell according to the invention.

EXAMPLE 6

Figure 7:
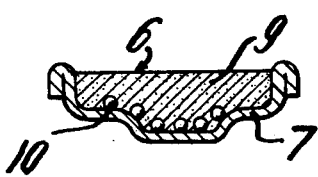
FIG. 7 and FIG. 8 are sectional elevations of the anode active material portions of cells according to this invention.

FIG. 7 shows a sectional elevation view of an anode active material portion of one embodiment of a cell of this invention. Wherein, "6" is the anode active material of this invention, "7" is an anode cap which comprises a negative terminal, "9" is an anode mix gelatinized with the amalgamated zinc powder of 48-150 mesh containing 5% of mercury by weight with a gelatinizer such as sodium polyacrylate, carboxymethyl cellulose or the like, or press-formed and "10" is a set of indium balls of 2-10 micron size.

Further, indium balls are used in this embodiment, but the shape of the indium can be arbitrarily selected according to your wishes. For example, the indium may take the form of foil, plate, thready type, fibroid type, block or the like.

And the electrical connection between the indium and the anode cap "7" may be made by any suitable means such as electric-welding, pressure fastening, heat fused fastening or the like process, if necessary.

EXAMPLE 7

Figure 8:
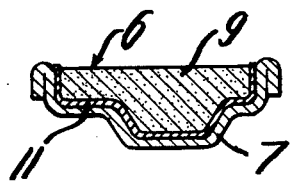

FIG. 8 is also a sectional elevation view of the anode active material portion of a cell of this invention. Wherein, "6" is the anode active material of this invention, "9" is an anode mix gelatinized with the amalgamated zinc powder of 48-150 mesh with a gelatinizer such as sodium polyacrylate, carboxymethyl cellulose or the like or press-formed, "7" is an anode cap which comprises a negative terminal and "11" is a layer of indium disposed on part or all over the inner surface of the anode cap "7".

The said indium layer may be formed by utilizing ion-plating, electro-plating, vacuum evaporating coating or spattering processes. And it is also effective that the indium sheet and the plate material of the anode cap are previously cladded.

As mentioned above, cells using the anode active material of this invention are shown in examples 4-7 and when such cells discharge, the discharging curves exhibit two step plateaus at the end stages thereof similar to those of examples 1-3.

Accordingly, the consumption of the zinc which is the main active material can be detected and the approach of the cell life end can be forecast.

The above embodiments have been described with respect to silver oxide cells ($Zn$-$Ag_2O$), $Zn$-$AgO$) but this invention can be applied to other alkaline cells such as nickel-zinc cell, air-zinc cell, alkali-manganese cell, mercury oxide cell and the like.

As described above, this invention utilizes the voltage change of the cell at the end discharging stage thereof which is determined by continuously detecting the cell voltage during operation of the cell and for learning the approaching exhaustion of the cell life.

Therefore, by using this invented cell as the power source in various cell powered instruments, the approach of the cell life end can be noticed before the operations thereof stop completely.

This invention provides a very suitable cell for use as the power source of various instruments such as electronic wrist watch, camera, pocket bell, artificial cardio stimulating device, table calculator, cigaret lighter, hearing aid or the like and accordingly has a large industrial value.

We claim:

1. In an electrochemical cell of the type which generates electrical energy and exhibits an output discharge voltage: an anode cap; and a consumable anode contained within said anode cap and comprised of a main anode active material and a secondary anode active material present in amounts effective to obtain a cell discharge voltage at one substantially constant voltage level during substantially the whole useful life of the cell due to consumption of said main anode active material followed by an abrupt lowering of the cell discharge voltage to a distinctly lower voltage level for substantially the remainder of the cell useful life due to consumption of said secondary anode active material thereby enabling detection of the approaching exhaustion of the cell by the abrupt change of the cell discharge voltage, said main anode active material comprising zinc and said secondary anode active material comprising indium present in an amount of from more than 2% to 10% by weight with respect to the weight amount of said zinc, and said secondary anode active material being disposed principally along the interior surface of said anode cap.

2. A cell according to claim 1; wherein said secondary anode active material further includes mercury.

3. A cell according to claim 2; wherein the mercury is present in an amount of from 2% to 14% by weight with respect to the weight amount of said zinc.

4. A cell according to claims 1, 2 or 3; wherein the indium is in the form of ball-shaped elements of 2-10 micron size disposed along the interior surface of said anode cap.

5. A cell according to claim 4; wherein said ball-shaped elements are disposed in only a single layer along the interior surface of said anode cap.

6. A cell according to claim 1, 2 or 3; wherein the indium is in the form of a layer disposed on at least part of the interior surface of said anode cap.

7. A cell according to claim 6; wherein the indium layer comprises an ion-plated, electroplated, vacuum-evaporated or sputtered layer.

8. A cell according to claim 6; wherein the indium layer comprises an indium sheet cladded to the inner surface of said anode cap.

* * * * *